United States Patent [19]

Yamauchi et al.

[11] Patent Number: 4,967,295
[45] Date of Patent: Oct. 30, 1990

[54] HUMIDITY REGULATING APPARATUS FOR MAGNETIC DISK DRIVE

[75] Inventors: Shiro Yamauchi; Naotake Rito; Nobuyoshi Takahashi, all of Amagasaki, Japan

[73] Assignee: Mitsubishi Denki Kabushiki Kaisha, Tokyo, Japan

[21] Appl. No.: 203,837

[22] Filed: Jun. 8, 1988

[30] Foreign Application Priority Data

Jun. 8, 1987 [JP] Japan .................................. 62-142720
Oct. 9, 1987 [JP] Japan .................................. 62-255360

[51] Int. Cl.$^5$ ............................................ G11B 5/012
[52] U.S. Cl. ................................. 360/97.02; 360/137; 236/44 R
[58] Field of Search ............... 360/97.02–97.04, 360/137; 236/44 R, 44 C, 44 E

[56] References Cited

U.S. PATENT DOCUMENTS

| | | | |
|---|---|---|---|
| 3,547,348 | 12/1970 | Kruper | 236/44 R |
| 3,840,176 | 10/1974 | Baysinger | 236/44 R |
| 4,307,425 | 12/1981 | Kaneko et al. | 360/97.03 |
| 4,620,248 | 10/1986 | Gitzendanner | 360/97.02 |
| 4,642,715 | 2/1987 | Ende | 360/97.02 |
| 4,684,510 | 8/1987 | Harkins | 360/97.02 X |
| 4,685,303 | 8/1987 | Branc et al. | 236/44 C X |

FOREIGN PATENT DOCUMENTS 52-38909 3/1977 Japan ................................... 360/97.02

Primary Examiner—John H. Wolff

[57] ABSTRACT

Apparatus for regulating the humidity inside a semi-sealed, partly air-permeable container for a magnetic disk drive. An opening provided in the semi-sealed container is sealed by an insulated humidity regulating element which includes a hydrogen ion conductor (which may be a solid electrolyte) and porous film-like first and second electrodes that are bonded to respective surfaces of both sides of the hydrogen ion conductor. A DC voltage is impressed across both electrodes to regulate the humidity.

8 Claims, 2 Drawing Sheets

HUMIDITY REGULATING APPARATUS FOR MAGNETIC DISK DRIVE

BACKGROUND OF THE INVENTION

This invention relates to a humidity regulating apparatus whereby the humidity inside a semi-sealed container having an interior indirectly exposed to outside air can be regulated, and particularly to such an apparatus for a magnetic disk drive.

FIG. 1 is a partial cross-sectional diagram illustrating a conventional magnetic disk drive having a humidity regulating apparatus. Such a diagram is described on page 17 of paper No. 46-2 "TRIBOLOGY FOR MAGNETIC DISK STORAGE" of the No. 36 research association materials of a meeting of The Magnetics Society of Japan (Corporation) (held at the Kikai Shinko Hall July 21, 1986) titled MAGNETIC RECORDING (MAGNETIC RECORDING AND TRIBOLOGY). FIG. 2 is a graph of the adsorptive quantity of moisture of silica gel based on a wt% ratio of absorbed water per absorbent (g:g) listed, for example, on page 854 of the *Handbook of Chemical Engineering* (editor: Chemical Engineering Society of Japan) issued by Maruzen Co., Ltd. (2-6 Nihonbashi-doori, Chuo-ku Tokyo).

In FIG. 1 semi-sealed type container 1 for magnetic disk drive comprises a base 2 and a case 3 that is secured in a sealed manner on the base 2. Several ventilation holes 4 are provided in the top of case 3. Cap 5 is secured on the top of case 3 to cover the ventilation holes 4. Several ventilation holes 6 are provided in cap 5. Primary filter 7 is fitted inside cap 5 between ventilation holes 4 and 6. Filter case 8 is secured to the inner surface of case 3. Secondary filter 9 is fitted inside filter case 8 and covers ventilation holes 4. Throttle 12 is fitted into the top of absorbent case 11. Filter 14 is inserted between throttle 12 and silica gel 13.

A container of a conventional humidity regulating apparatus used in magnetic disk drives encloses a disk that is driven and rotated, a head that is held in proximity to the recording surface of the disk thereof and an actuator that causes the head to move in the radial direction of the disk.

Outside air is sucked in by rotation of the disk is cleaned by passing through ventilation holes 6 of cap 5,. primary filter 7, ventilation holes 4 of case 3, secondary filter 9 and throttle 10 of filter case 8,. and flows into the inside of container 1. Water in the outside air also enters the container 1 through diffusion and the humidity inside the container rises. If rotation of the disk is stopped and the head is made to contact the disk in this state,. there is a danger of stiction wherein the head sticks to the disk. The disk, and possibly the head can be damaged if the disk drive is restarted in this condition.

A moisture adsorption device, including silica gel 13 in the absorbent case 11, is provided inside container 1 to adsorb the water that has entered. Further, throttle 12 provided at absorbent case 11 controls the adsorptive quantity of the water and prevents the inside of container 1 from attaining excessively low humidity.

Silica gel 13 is porous, and its surface area per unit weight is extremely large. Further, the absorptive quantity of moisture of silica gel 13 is almost proportional to humidity within a range of humidity in which the gel structure is maintained as illustrated in FIG. 2. However, when the humidity rises and the water content increases, a state of saturation is reached. In a conventional humidity regulating apparatus such as described aboVe. When the adsorptive quantity of moisture in silica gel 13 reaches a state of saturation, the capability to adsorb water is lost even if the humidity rises excessively.

Furthermore, there have been problems in that the adsorptive quantity of moisture could not be regulated if the size of throttle 10 that regulates the suction of the outside air and the size of throttle 12 that controls the adsorptive quantity of moisture were fixed and in that the humidity inside container 1 could not be regulated in accordance with changes in the humidity of the outside air.

SUMMARY OF THE INVENTION

In view of the foregoing, it is an object of this invention to provide a humidity regulating apparatus to regulate the internal humidity in accordance with the changes in the humidity of the outside air without the adsorptive quantity of moisture reaching a state of saturation. According to the invention the opening provided in the semi-sealed type container is closed by a humidity regulating element comprising a hydrogen ion conductor which preferably is a solid electrolyte and porous film-like primary and secondary electrodes that are bonded to respective surfaces on both sides of this hydrogen ion conductor. In operation. DC voltage is applied across both of the electrodes.

Another object of this invention is to provide a humidity regulating apparatus whereby ion conductivity is heightened, and wherein the apparatus is made even more effective in its dehumidifying capability by embedding a heater in the hydrogen ion conductor.

BRIEF DESCRIPTION OF THE DRAWINGS

The foregoing and other objects of the invention now will be described in detail with reference to the accompanying drawings, in which.

DETAILED DESCRIPTION OF THE PREFERRED EMBODIMENTS

One embodiment of the humidity regulating apparatus according to the present invention will be described with reference to FIGS. 3 and 4.

Figure 1:
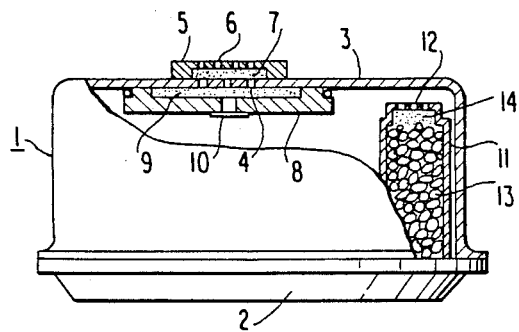
FIG. 1 is a partial cross-section diagram of a conventional humidity regulating apparatus
Figure 2:
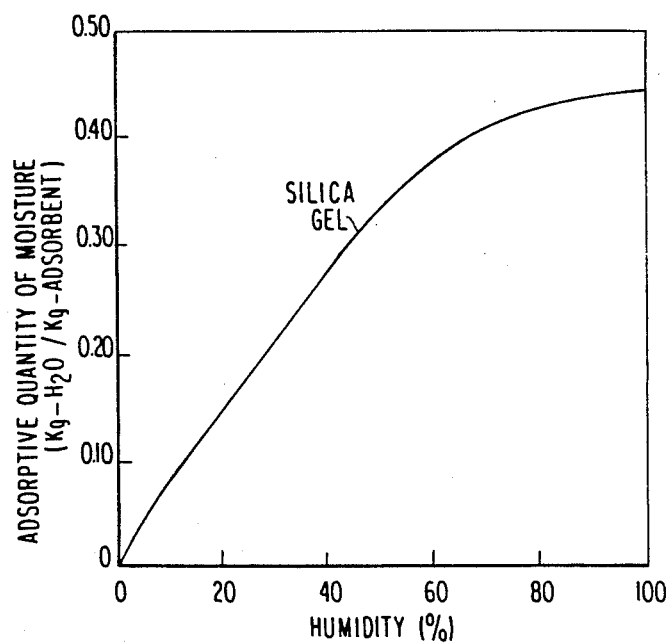
FIG. 2 is a characteristic curve illustrating the adsorptive quantity of moisture of silica gel.
Figure 3:
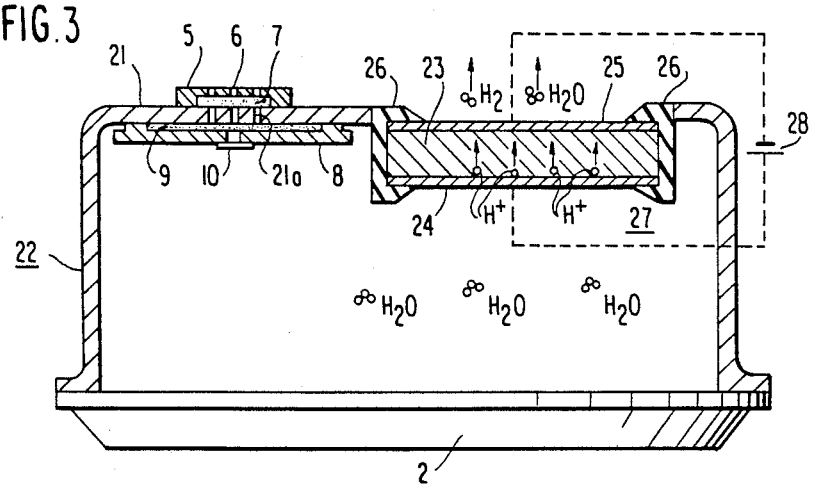
FIG. 3 is a partial cross-section of a humidity regulating apparatus according to on Ⓡembodiment of the present invention.

In FIG. 3, base 2, cap 5, several ventilation holes 6 primary filter 7, filter case 8, secondary filter 9 and throttle 10 are identical to those in the device of FIG. 1. Case 21 is secured in an air-tight manner on base 2 and comprises a semi-sealed type container 22. Several ventilation holes 21a are provided in the top of case 21. Hydrogen ion conductor 23 comprises a solid electrolyte such as a solid polymer. A lower surface of the conductor 23 faces the inside of the container 22, and an upper surface faces the outside. A first porous film electrode 24 is bonded onto the lower surface of hydrogen ion conductor 23. A second porous film electrode 25 is bonded onto the upper surface of hydrogen ion conductor 23. Insulator 26 is provided between the assembly including hydrogen ion conductor 23, first electrode 24 and second electrode 25 and case 21. The elements 23-26 constitute a humidity regulating element 27. DC power supply 28, which may be variable is connected across the first electrode 24 and the second electrode 25.

The operation of the just-described apparatus is as follows. Clean air that has passed via ventilation holes 6 of cap 5. primary filter 7, ventilation holes 21a of case 21, secondary filter 9 and throttle 10 of filter case 8, and the water in the outside air simultaneously flow into container 22. The first electrode 24 is in contact with the air inside container 22,. and the second electrode 25 is in contact with the outside air. The voltage of DC power supply 28 is impressed with the first electrode 24 as the anode and the second electrode 25 as the cathode so that the following electrolysis reaction proceeds at the boundary layer of the first electrode 24 and hydrogen ion conductor 23.

$$H_2O \; 2H^+ + \tfrac{1}{2}O_2 + 2e^-$$

That is, the water contained in the air inside container 22 is electrolyzed, the hydrogen ions shift towards cathode electrode 25, oxygen molecules remain inside container 22 and the charge shifts to anode electrode 24.

When these hydrogen ions reach the boundary layer of hydrogen ion conductor 23 and second electrode 25 at least one of the following two electrolysis reactions proceeds.

$$2H^+ + \tfrac{1}{2}O_2 + 2i^- \; H_2O$$

$$2H^+ + 2e - H_2$$

That is, when the speed at which the hydrogen ions are supplied to the second electrode 25 from hydrogen ion conductor 23 exceeds the speed of supply the oxygen to the second electrode 25 from the outside air, both water and hydrogen are formed. Water alone is formed when the speed of supply of the hydrogen ions is below the speed of supply of the oxygen.

Figure 4:
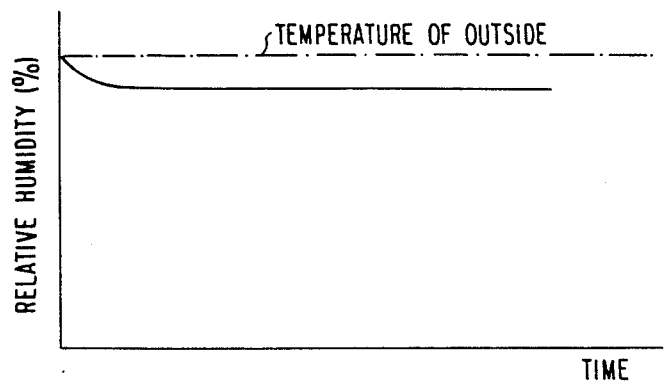
FIG. 4 is a characteristic curve showing the dehumidifying characteristics of the humidity regulating apparatus illustrated in FIG. 3.

Accordingly, the humidity inside container 22 initially is the same as the humidity of the outside air as illustrated in FIG. 4. However, as time passes, dehumidification proceeds. The water in the air that flows in via ventilation holes 6 of cap 5, primary filter 7, ventilation holes 21a of case 21 secondary filter 9 and throttle 10 of case 8, and the water discharged to the outside air by humidity regulating element 27 finally equalize, and dehumidification is carried out to a predetermined level. Further, when the voltage impressed across first electrode 24 and second electrode 25 rises, the electrolyzing current is increased and the electrolysis reaction is speed up. As a result, if the amount of air that flows into container 22 is constant, the internal dehumidification speed increases.

Figure 5:
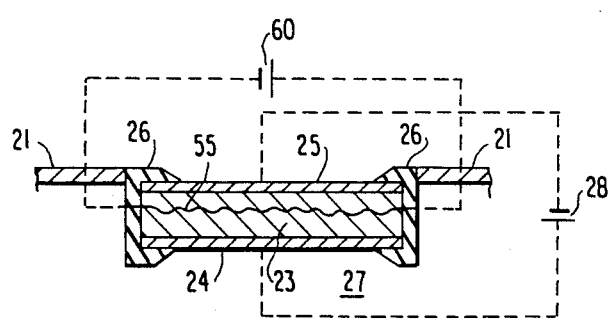
FIG. 5 is a partial cross-sectional diagram illustrating the main parts of a humidity regulating apparatus according to another embodiment of this invention.

FIG. 5 is a cross-section illustrating the main parts of another embodiment of the present invention, in which case 21 hydrogen ion conductor 23, first electrode 24, second electrode 25, DC power supply 28, and insulator 26 are the same as those parts in the example of FIG. 3. Heater 55 is embedded in hydrogen ion conductor 23. Humidity regulating element 27 comprises hydrogen ion conductor 23, first electrode 24, second electrode 25, and insulator 26. DC power supply 60 is connected to both ends of heater 55. In operation, when the voltage of DC power supply 60 is impressed to heater 55 and hydrogen ion conductor 23 is heated, the ion conductivity is heightened and an even more effective dehumidification capability can be expected.

Moreover, in this last working example, although voltage was impressed with first electrode 24 as the anode and second electrode 25 as the cathode, when voltage is impressed with first electrode 24 as the cathode and second electrode 25 as the anode. the electrolysis reaction proceeds in the opposite direction to that of the aforementioned working example, and the humidity inside container 22 becomes higher than that of the outside air, so that the inside is humidified.

Further, hydrogen ion conductor 23 in the above-described embodiments may be solid polymer electrolytes such as an ion exchange resin, or an inorganic solid electrolyte such as a β-alumina substitute. The same action can be expected if they comprise solid electrolytes.

In addition, although the foregoing embodiments were illustrated using atmospheric air as the outside air gasses containing one or more of oxygen, nitrogen, water hydrogen helium argon, etc. are permissible. When the outside air is a gas that does not contain oxygen a hydrogen generating reaction only is performed on second electrode 25 for hydrogen that is supplied to second electrode 25 from hydrogen ion conductor 23.

Thus, according to this invention, a humidity regulating apparatus can be provided whereby humidity inside can be regulated inside a disk drive enclosure in accordance with the changes in humidity of the outside air without the adsorptive quantity of moisture reaching a state of saturation as the water in the air that is supplied to hydrogen ion conductor 23 after having contacted the first electrode 24 is electrolyzed by impressing a DC voltage across first electrode 24 and second electrode 25 of humidity regulating element 27, so that the hydrogen ions are caused to shift and at least one of hydrogen and water is discharged from second electrode 25.

Furthermore according to this invention a humidity regulating apparatus can be provided whereby the ion conductivity of hydrogen ion conductor 23 can be further heightened and a more effective dehumidification capability can be expected by embedding a heater 55 in hydrogen ion conductor 23 of humidity regulating element 27 and impressing a DC voltage to the heater 55.

While the invention has been described in detail with reference to preferred embodiments thereof various modifications within the spirit of the invention will be apparent to ordinarily skilled artisans. Thus, the scope of the invention is limited only by the appended claims which follow immediately.

What is claimed is:

1. A humidity regulating apparatus comprising:
   a semi-sealed partly air-permeable container having an opening in a walled thereof;
   a hydrogen ion conductor provided in the opening, aid conductor comprising a solid electrolyte and having an inner surface facing an interior of said container and an outer surface facing toward outside air;
   a first porous film-like electrode that is bonded to the inner surface of said hydrogen ion conductor;
   a second porous film-like electrode that is bonded to the outer surface of said hydrogen ion conductor;

insulating material for electrically insulating said hydrogen ion conductor, and said first and second electrodes from said semisealed type container, said insulating material sealing said opening; and a first power supply for impressing a first DC voltage across said first and second electrodes so as to induce an electrolytic reaction in said hydrogen ion conductor for regulating humidity within said container.

2. A humidity regulating apparatus as claimed in claim 1, further including:

a heater embedded in the hydrogen ion conductor; and a second power supply for impressing a second DC voltage across said heater.

3. A humidity regulating apparatus as claimed in claim 1, wherein the first electrode is the anode and the second electrode is the cathode.

4. A humidity regulating apparatus as claimed in claim 3, wherein said power supply is variable.

5. A humidity regulating apparatus as claimed in claim 1 wherein the hydrogen ion conductor is a solid polymer electrolyte.

6. A humidity regulating apparatus as claimed in claim 5, wherein the solid polymer electrolyte is an ion exchange resin.

7. A humidity regulating apparatus as claimed in claim 1, wherein the hydrogen ion conductor is an inorganic solid electrolyte.

8. A humidity regulating apparatus as claimed in claim 7, wherein the inorganic solid electrolyte is a $\beta$-alumina substitute.

* * * * *

UNITED STATES PATENT AND TRADEMARK OFFICE
CERTIFICATE OF CORRECTION

PATENT NO. : 4,967,295

DATED : October 30, 1990

INVENTOR(S) : Shiro Yamauchi et al.

It is certified that error appears in the above-identified patent and that said Letters Patent is hereby corrected as shown below:

Col. 3, line 24, delete "$H_2O2H^+ + \frac{1}{2}O_2 + 2e^-$"

and insert -- $H_2O \rightarrow 2H^+ + \frac{1}{2}O_2 + 2e^-$ --;

line 34, delete "$2H^+ + \frac{1}{2}O_2 + 2i^- H_2O$"

and insert -- $2H^+ + \frac{1}{2}O_2 + 2e^- \rightarrow H_2O$ --;

line 36, delete "$2H^+ + 2e - H2$"

and insert -- $2H^+ + 2e^- \rightarrow H_2$ --.

Signed and Sealed this

Sixteenth Day of June, 1992

*Attest:*

DOUGLAS B. COMER

*Attesting Officer*   *Acting Commissioner of Patents and Trademarks*